March 2, 1971
G. D. NOLAN
3,567,679
REMOVAL OF SOLVENTS FROM SEALANT COMPOSITIONS
Filed Dec. 28, 1967
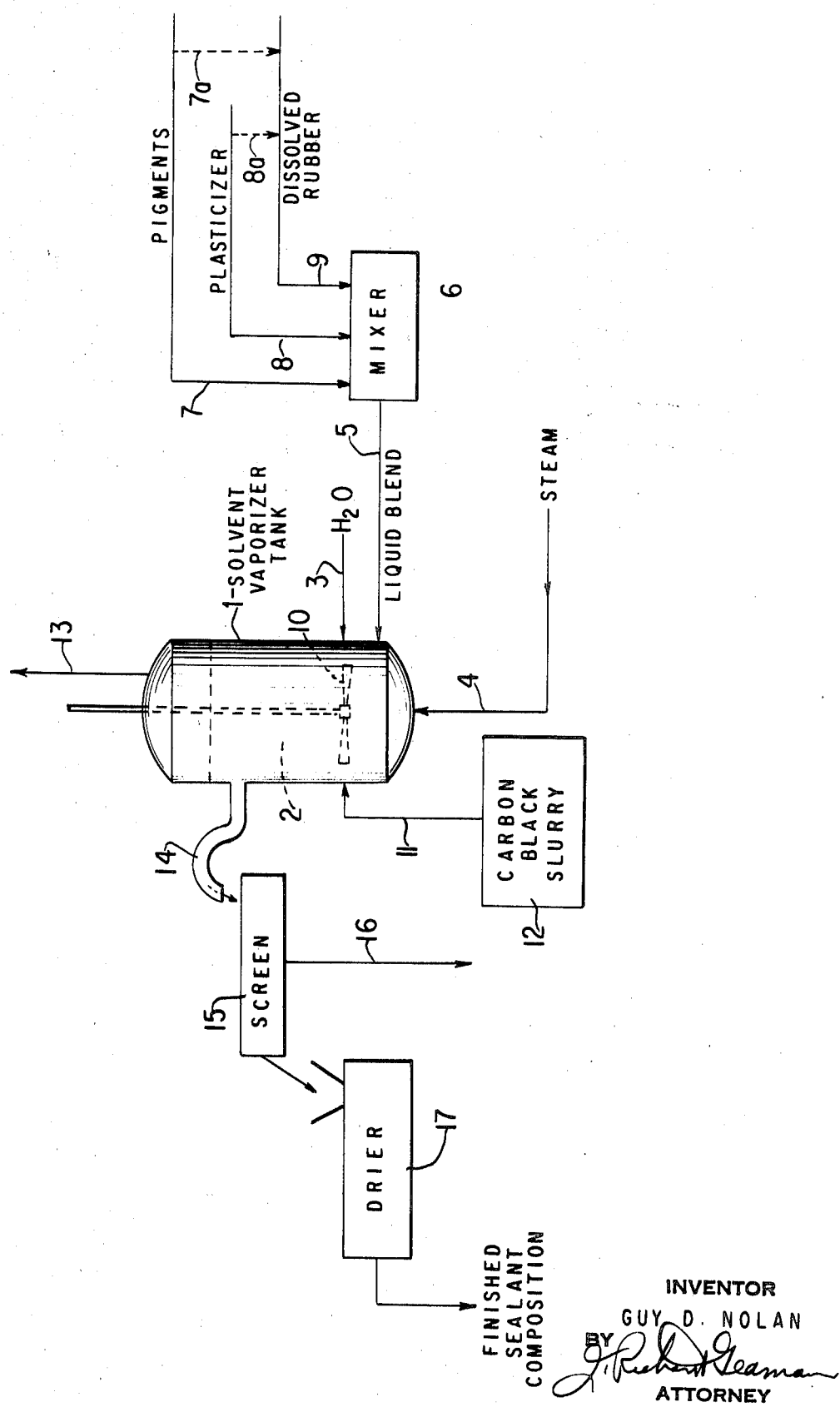
INVENTOR
GUY D. NOLAN
BY
ATTORNEY United States Patent Office 3,567,679
Patented Mar. 2, 1971

3,567,679
REMOVAL OF SOLVENTS FROM
SEALANT COMPOSITIONS
Guy D. Nolan, Monroe, La., assignor to
Cities Service Company
Filed Dec. 28, 1967, Ser. No. 700,315
Int. Cl. C08c 11/18
U.S. Cl. 260—41.5
10 Claims

ABSTRACT OF THE DISCLOSURE

Soft, nontacky, processable crumbs of sealant compound are formed by removal of an organic solvent from a liquid blend of sealant components by mixing the blend with hot water having carbon black dispersed therein. The carbon black of the aqueous dispersion is incorporated with the sealant composition.

BACKGROUND OF THE INVENTION

Field of the invention

This invention relates to elastomeric sealant compositions. More particularly, it relates to the removal of organic solvent from a liquid blend of the constituents of the sealant composition.

Description of the prior art

Elastomeric sealant compositions are supplied to users in the form of putty-like caulks, strips or tapes for weather sealing structural joints, e.g. sealing compounds for walls, windows and roofs. Such sealants generally have such properties as the ability to stretch, good recovery characteristics, resistance to cohesive failure, and, particularly, for certain of the newer synthetic elastomers, excellent weathering properties. In order to produce an elastomeric sealant composition with such properties as ease of application, good wetting properties toward the joined surfaces and ability to stretch without loss of adhesion to the joined surfaces, however, it is usually necessary that the composition contain large quantities of plasticizers and, in some instances, a solvent that evaporates after the sealant has been applied. Accordingly, typical sealants are soft compositions with a Shore A hardness value in the range of from about 10 to about 30 and a Mooney viscosity (ML-4 at 212° F.) of from about 5 to about 20.

Typical sealant compositions also contain relatively large amounts of carbon black and an inorganic filler pigment such as calcium carbonate, zinc oxide or clay. It is particularly difficult, and in some instances impossible, to get good dispersion of these pigments throughout the sealant composition by the usual method of dry compounding of ingredients within internal mechanical mixers such as a Banbury or Baker-Perkins mixer. More recently, therefore, processes have been devised whereby the ingredients of the sealant composition are at least partially compounded in the liquid phase by blending the plasticizer and pigment with the elastomer while it is dissolved in an organic solvent. The elastomer will usually be dissolved at a concentration of about 5% to 30%, by weight in a water immiscible solvent such benzene or hexane. Upon adding a plasticizer and pigments to the elastomer solution, the plasticizer will be readily dissolved and the pigments may be incorporated therein by vigorous agitation of the resultant liquid blend.

It will be appreciated, however, that all, or at least a considerable portion, of the organic solvent must be removed from the blend of dissolved elastomer, plasticizer and pigments to obtain a sealant composition with the proper consistency. Although this may be accomplished in a number of ways, it is most conveniently accomplished by contacting the liquid blend with a body of hot water maintained at a temperature above the boiling point of the solvent so that the solvent is thus vaporized and removed to affect agglutination of the nonvolatile constituents of the blend. The devolatilized sealant composition may then be removed from the hot water bath and dried, and, if necessary, subjected to mastication to further improve the consistency of the blend and the dispersion of pigment therein. While hot-water vaporization of the solvent from liquid blends of the sealant composition is a quick, safe and economical procedure, it has heretofore been plagued with difficulty since the sealant composition, upon evaporation of the solvent, may become so sticky that it cannot be processed, i.e. the composition may adhere to the surfaces of the evaporator apparatus, and to itself, to such an extent that the operation is disrupted. If the liquid blend is desolventized in a vessel that contains a body of hot water that is being agitated with a mechanical stirrer, the composition will not only build up on the walls of the vessel, but it will also stick to the stirrer and quickly impair its function. Furthermore, particles of the composition may coalesce as they are suspended in the hot water bath, and the coalescence may continue until large balls are formed that cannot be easily removed from the bath or thereafter handled or processed.

It is an object of this invention, therefore, to provide an improved method for removing organic solvent from liquid blends or elastomeric sealant compositions.

It is another object of the invention to provide a method of producing nontacky, processable crumbs of an elastomeric sealant composition by the removal of organic solvent from a liquid blend of elastomeric sealant constituents.

It is a further object of the present invention to provide an improved process for empolying hot water in the removal of organic solvent from elastomeric sealant compositions.

Other objects and advantages of the invention will become readily apparent from the following description of the present invention, the novel features of which are set forth in the appended claims.

SUMMARY OF THE INVENTION

The present invention overcomes the problem of excessive sticking and coalescence of the sealant composition during hot-water removal of the solvent by inclusion of colloidally dispersed carbon black within the body of hot water within which the liquid blend of sealant constituents is desolventized. The liquid blend may be maintained as a dispersion of liquid droplets in the body of hot water during vaporization of the solvent by stirring the body of hot water. The solvent is vaporized by heat absorbed from the water. The water-dispersed carbon black becomes agglutinated with the nonvolatilized sealant constituents of the globules of sealant blend. Most amazingly, nontacky, processable crumbs of the elastomeric sealant are formed, and all problems of coalescence and sticking of the material during vaporization of the solvent is thereby eliminated. The crumbs formed by the practice of this invention, therefore, may be easily removed from the vaporizer and may subsequently be drained and dried without handling and processing difficulties.

It will be apparent that the present invention is primarily concerned with maintaining the sealant composition as a nontacky crumb only temporarily, e.g. insofar as the solvent removal and water drainage steps are concerned. It will usually be desirable to coalesce the resultant crumbs into putty-like caulks or preformed strips or tapes. The crumbs formed by this invention may be easily coalesced by pressure and/or mastication applied with a ram press, screw press, internal mixer or extruder.

Advantageously, simultaneous drying and coalescence of crumbs may be carried out in commercially available extrusion drying apparatus.

BRIEF DESCRIPTION OF THE DRAWINGS

The invention is hereinafter described in further detail with reference to the accompanying drawing that is a somewhat diagrammatic flow sheet showing one embodiment of the present invention in the continuous production of elastomeric sealant compositions from liquid blends of the sealant constituents.

DETAILED DESCRIPTION OF THE INVENTION

The amount of carbon black dispersed in the body of hot water during vaporization of the solvent is not critical but may generally be within the range of about 1% to about 5% by weight, on a dry basis, of the total carbon black content of the sealant composition. It should be pointed out that essentially all of the carbon black dispersed in the hot water may be removed therefrom by agglutination of the black with the crumb. Thus, the final carbon black content of the sealant composition may be carefully regulated by adjusting the proportion of carbon black incorporated separately into the liquid blend and into the body of hot water. The amount of black incorporated into the liquid blend, in other words, is reduced by an amount equal to that which will be agglutinated with the crumb during the solvent removal step of the present invention. In this manner, crumbs can be produced having a preselected content of elastomer, plasticizer, and pigments. Amounts of carbon black other than those previously indicated may be dispersed in the hot water since the amount actually employed may be regulated by the operator to control crumb size as well as tackiness and coalescence of the sealant composition during the solvent removal step. Within limits, increasingly small crumbs will form as the amount of carbon black agglutinated with the sealant composition during solvent removal is increased.

The invention has been employed to particular advantage with elastomer sealant compositions having Shore A hardness and Mooney viscosity values within the ranges previously described as typical. Generally, sealant compositions of such consistency will contain from about 50 to about 210 parts by weight of plasticizer, from about 25 to about 80 parts of carbon black, and from about 20 to about 600 parts by weight of inorganic filler for each 100 parts by weight of elastomer. More commonly, such compositions will contain, for each 100 parts by weight of the elastomer, from about 60 to about 130 parts by weight of plasticizer, from about 50 to about 75 parts by weight of carbon black, and from about 30 to about 550 parts by weight of inorganic filler.

The elastomer of the sealant compositions processed in accordance with present invention may be any convenient rubber. Those readily available in solution form such as butyl rubber, ethylene-propylene rubber, and ethylene-propylene terpolymer rubber are particularly suitable. Elastomeric sealant compositions may be plasticized with a number of different ingredients, and the present invention has been successfully applied to compositions plasticized with rubber extender oil, low molecular weight polybutene, and mixtures thereof. Furthermore, the invention is not limited as to the type of inorganic filler or grade of carbon black that is incorporated into the sealant. The invention has been successfully employed with respect to sealant compositions containing various grades of carbon black and a variety of fillers such as clay, calcium carbonate and zinc oxide.

In FIG. 1 of the drawing, solvent vaporizer tank 1 is filled with a body of water 2 supplied through line 3 and heated by the introduction of steam through line 4. A liquid blend of sealant constituents is introduced into the vaporizer tank through line 5, the blend having been made up in mixer 6 from elastomer dissolved in a water immiscible organic solvent. Any form of mixer may be employed that thoroughly blends the pigments into the dissolved elastomer, e.g. a high shear mechanical or hydraulic mixer. Where preferable and pratical, one or more of the pigments may be slurried in water prior to blending with the elastomer solution in the mixer. Pigments, plasticizer, and dissolved rubber are supplied to the mixer through lines 7, 8 and 9, respectively. However, the plasticizer and/or the pigments may alternatively be passed through lines 8a and 7a, respectively, for preliminary combination with the dissolved rubber before being introduced into the mixer for final blending.

The liquid blend is introduced into solvent vaporizer tank 1 well below the surface of the body of hot water 2 and is converted into droplets which disperse and become suspended within the water bath for absorption of heat therefrom. Advantageously, the liquid blend may be converted into droplets as it enters the tank by means of an eductor mixer while employing steam or hot water as the driving fluid, since the liquid blend of sealant constituents can be very effective fragmented in this fashion. Alternatively, the liquid blend may be fragmented by injection into the vaporizer tank through one or more small orifices or else sufficient agitation may be supplied by means of stirrer 10 to disperse the liquid blend into droplets while swirling the water bath at the same time.

Once the droplets of liquid blend are formed in the water bath, they are maintained dispersed by agitation of the water with the stirrer. Vaporization of solvent from the droplets commences and proceeds swiftly by absorption of heat from the water, and coalescence and sticking of the nonvolatiles of the droplets would occur rapidly if carbon black were not added to the water bath in the vaporizer tank. While carbon black may be added to the water bath as a dry powder for colloidal dispersion therein, the input rate and dispersion of the carbon black can be more nicely controlled by performing an aqueous slurry of the black before it is introduced into the tank. The black slurry can, therefore, be introduced into the tank at a controlled rate through line 11 from a slurry make-up and supply system, generally represented at 12. With most carbon blacks, readily flowing, unstabilized aqueous slurries can be formed at concentrations of 8–10% by weight, or higher, by slurrying processes that are well known to those skilled in the art. One such process which may be employed for producing aqueous carbon black slurries that are highly satisfactory for the present invention is described in U.S. Pat. 3,032,430 entitled "Process for Effecting Particulate Dispersions."

As previously indicated, the rate at which carbon black is added to the water bath may be regulated and controlled so that agglutination of the black with the desolventized crumbs is essentially complete. Thus, the rates at which carbon black is supplied to mixer 6 and tank 1 are adjusted to provide a desolventized crumb of the sealant composition having a content of carbon black that will not vary in excess of 1–2 parts by weight from the targeted content of the finished composition. Such variation is well within acceptable limits.

After vaporization of the organic solvent in tank 1, it is removed from the tank through line 13 and may be passed to a solvent recovery system, not shown. The nontacky crumbs of sealant constituents are removed from the tank through a spout 14 by entrainment within water overspill from the tank. The crumb is then separated from the overspilled water by means of a screen represented at 15. Water which has been drained from the crumb is carried away through line 16, and it may be passed to waste or recycled to tank 1. Once the crumb has been drained of water, it is then passed from the screen to a drier, represented at 17, for final removal of moisture. If an extrusion drier is employed, the crumb is thoroughly masticated and coalesced during the drying process.

The temperature of the water bath inside the vaporizer tank is, of course, regulated to provide removal of organic solvent from the crumbs to the extent desired. The temperature employed will, of course, depend upon the selection of solvent for dissolving the elastomer. The temperature of the bath can be readily maintained so as to assure essentially complete vaporization of the solvent within the vaporizer tank while operating near atmospheric pressure, e.g. −10 to +10 inches of water. It is also within the scope of this invention to vaporize only a portion of a relatively low boiling solvent, the remaining portion to be vaporized during extrusion drying of the crumb or at ambient temperature after the sealant has been used.

The following example is presented for illustrative purposes and should not be construed as limiting the scope of the invention herein described.

EXAMPLE

Ingredients were introduced into a mixing tank at the following proportion by weight:

TABLE I

|  | Parts |
| --- | --- |
| n-Hexane | 400 |
| Bucar 5000 NS [1] | 100 |
| Indopol H-100 [2] | 65 |
| Micro-White No. 95 [3] | 35 |

[1] Brand of butyl rubber marketed by Columbian Carbon Co.
[2] Brand of polybutene extender marketed by Amoco Chemical Corp.
[3] Brand of calcium carbonate filller marketed by Sylacauga Calcium Products Company.

The hexane, rubber, polybutene and calcium carbonate mixture was passed through a circulating loop by means of a mixing pump until rubber and extender were dissolved and the calcium carbonate was dispersed within the solution. This soltuion of butyl rubber containing polybutene and calcium carbonate was then pumped at a constant rate from the tank to a second mixer into which 5% by weight aqueous slurry of HAF-HS carbon black was pumped at a rate to provide 70 parts by weight of black to the ingredients listed in Table I, above. 50 parts by weight of Sunpar 2100 (brand of paraffinic extender oil marketed by Sun Oil Company) was added to the rubber solution before it entered the second mixer. The rubber solution containing extenders and mineral filler was vigorously agitated in the second mixer with the aqueous carbon black slurry to effect transfer of the black from the aqueous medium into the rubber solution. After all of the aforementioned ingredients had thus been converted into a liquid blend, they were fed into a vaporizer tank containing an agitated body of hot water maintained at 190° F. with steam to effect substantially complete vaporization of the n-hexane. The vaporizer tank contained about 800 gallons of hot water which was agitated with a stirrer at 550 r.p.m. Another 1000 gallons of the water was recirculated to the tank from a holding tank after recovery from the tank overspill spout. The liquid blend was fed to the vaporizer tank at a rate to provide 350 pounds per hour of desolventized and demoisturized sealant compound having a composition as shown in Table II as follows:

TABLE II

|  | Parts |
| --- | --- |
| Butyl rubber | 100 |
| Carbon black | 75 |
| Indopol H-100 | 65 |
| Sunpar 2100 | 50 |
| Micro-White No. 95 | 35 |

Initially, no carbon black was added to the hot water in the vaporizer tank and the operation was disrupted when the devolatilized sealant composition coalesced and formed large balls that could not be removed from the tank by entrainment in the water overspill. After cleaning out the tank, the operation was resumed by adding a 5% by weight slurry of the HAF-HS carbon black to the water in the vaporizer tank to provide 3 parts by weight of carbon black to the sealant composition. Concomitantly, the rate at which aqueous carbon black slurry was added to the second mixer was reduced to provide only 67 parts by weight of black to the composition. Upon addition of the carbon black dispersion to the hot water, nontacky crumbs of the sealant composition were formed, and these were continuously removed from the vaporizer tank, while entrained in the water overspill therefrom, without further coalescence and sticking as disrupted the initial operation. Upon leaving the tank, the crumbs in the overspill water were passed onto a screen for draining. Water removed in the draining step was recycled to the tank. The drained crumb was then passed into an extrusion dryer for drying of the sealant composition to a moisture content of less than 1% by weight. No problems were experienced with sticking of the crumb to the screen during the draining step. It was possible therefore, to affect devolatilization, draining and finish-drying of the sealant composition simultaneously and continuously.

During the operation, no carbon black was noticed in the water overspilled from the vaporizer tank, indicating that all of the black was agglutinated with the desolventized crumb. This phenomenon was confirmed by subsequent analysis of the dried sealant composition, i.e. the composition contained the targeted 70 parts by weight of carbon black. This analysis also showed that the other ingredients shown in Table II were also incorporated into the composition at the proper proportion.

While the present invention has been described herein with respect to specific embodiments thereof, it will be appreciated that various changes and modifications can be made without departing from the scope of the present invention.

Therefore, I claim:

1. In a process for producing a coagulum of an elastomeric sealant composition from a liquid blend comprising (1) a solution of a rubber and a plasticizer dissolved in an organic solvent and (2) carbon black dispersed in said solution and wherein said liquid blend is introduced into a body of hot water maintained above the boiling point of said solvent for formation of a crumb coagulum of the monvolatile constituents of said liquid blend by vaporization and removal of said solvent therefrom, the improved method for preventing sticking and coalescense of the crumb coagulum which comprises the steps of:
    (a) introducing carbon black into said body of hot water separately from the carbon black incorporated into said liquid blend and dispersing said separately introduced carbon black within said body of hot water,
    (b) agitating the body of hot water which contains the carbon black and maintaining said liquid blend as a dispersion of droplets within the hot water during vaporization of the solvent from said droplets,
    (c) agglutinating said water-dispersed carbon black with the resulting coagulum of rubber which contains separately incorporated carbon black and plasticizer, and thus forming discrete, nontacky, processable crumbs of the sealant composition.

2. The process of claim 1 in which the amount of carbon black separately introduced into and dispersed within the hot water and agglutinated with the sealant constituents is within the range of from about 1% to about 5% by weight of the total carbon black content of the finished sealant composition.

3. The process of claim 1 in which the sealant composition is characterized by a Shore A hardness value within the range of from about 10 to about 30 and a Mooney viscosity, ML-4 at 212° F., of about 5 to about 20.

4. The process of claim 1 in which the resulting crumbs of said elastomeric sealant composition contain predetermined amounts of rubber, plasticizer, carbon black and inorganic rubber filler.

5. The process of claim 4 in which said elastomeric sealant composition contains from about 50 to about 210 parts by weight of plasticizer, from about 25 to about 80 parts by weight of carbon black, and from about 20 to about 600 parts by weight of inorganic rubber filler for each 100 parts by weight of rubber.

6. The process of claim 5 in which said solvent composition contains from about 60 to about 130 parts by weight of plasticizer, about 50 to 75 parts by weight of carbon black and about 30 to about 550 parts by weight of inorganic rubber filler.

7. The process of claim 5 in which the elastomer constituent of the sealant composition is selected from the group consisting of butyl rubber, ethylene propylene rubber, and ethylene-propylene terpolymer rubber.

8. The process of claim 5 in which the plasticizer is selected from the group consisting of rubber extender oil, low molecular weight polybutene, and mixtures thereof.

9. The process of claim 1 in which the carbon black that is dispersed in the body of hot water is introduced into said water as a preformed aqueous slurry of carbon black.

10. The process of claim 1 in which only a portion of the organic solvent in the liquid blend is vaporized by said contact with a body of hot water.

References Cited

UNITED STATES PATENTS

| 2,688,605 | 7/1954 | Tucker | 260—41.5PM |
| 3,255,149 | 7/1966 | Dye | 260—41.5PM |
| 2,974,377 | 14/1961 | Kunkle | 260—41.5 |
| 3,449,284 | 10/1969 | Pollock | 260—41.5 |

OTHER REFERENCES

A. Damusis "Sealants" September 67, p. 303, copy in group 145.

MORRIS LIEBMAN, Primary Examiner

T. MORRIS, Assistant Examiner